(12) United States Patent
Folkesson

(10) Patent No.: US 11,598,395 B2
(45) Date of Patent: Mar. 7, 2023

(54) TRANSMISSION FOR A VEHICLE

(71) Applicant: VOLVO TRUCK CORPORATION, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/693,348

(22) Filed: Mar. 12, 2022

(65) Prior Publication Data
US 2022/0290741 A1 Sep. 15, 2022

(30) Foreign Application Priority Data
Mar. 12, 2021 (EP) .................................... 21162190

(51) Int. Cl.
*F16H 3/64* (2006.01)
*F16H 3/78* (2006.01)

(52) U.S. Cl.
CPC ............... *F16H 3/64* (2013.01); *F16H 3/78* (2013.01); *F16H 2200/0065* (2013.01); *F16H 2200/0086* (2013.01); *F16H 2200/2007* (2013.01)

(58) Field of Classification Search
CPC ...... F16H 3/64; F16H 3/78; F16H 2200/0065; F16H 2200/0086; F16H 2200/0091; F16H 2200/2007
See application file for complete search history.

(56) References Cited

U.S. PATENT DOCUMENTS

| | | | |
|---|---|---|---|
| 6,669,596 B1* | 12/2003 | Sefcik | F16H 3/663 475/278 |
| 9,488,260 B2* | 11/2016 | Kaltenbach | F16H 37/046 |
| 10,746,263 B2* | 8/2020 | Schneidewind | F16H 3/663 |
| 2005/0187064 A1 | 8/2005 | Haka | |
| 2015/0276021 A1 | 10/2015 | Kim | |

OTHER PUBLICATIONS

Extended European Search Report, European Patent Application No. 21162190.9 dated Jun. 27, 2021, 9 pages.

* cited by examiner

*Primary Examiner* — Huan Le
(74) *Attorney, Agent, or Firm* — Sage Patent Group

(57) ABSTRACT

A transmission provides nine forward gears from the first gear to the ninth gear, including a first and a second planetary gear set configured axially in series, each planetary gear set configured to provide a first and a second forward speed reduction and one direct speed with a one to one (1:1) speed ratio, the first forward speed reduction being larger than the second forward speed reduction, wherein each planetary gear set is individually shiftable between three forward speeds with different speed ratios. The transmission is configured to provide the first to third gears by utilizing the first speed reduction of the second set, the fourth to fifth gears by utilizing the first speed reduction of the first set, the sixth to seventh gears by utilizing the second speed reduction of the first set, and the eighth to ninth gears by utilizing the direct speed of the first set.

18 Claims, 7 Drawing Sheets

| Gear/speed | Group1 | Group2 |
|---|---|---|
| R1 | 3 (Direct) | R |
| R2 | 2 | R |
| R1 | 1 | R |
| 1 | 1 | 1 |
| 2 | 2 | 1 |
| 3 | 3 (Direct) | 1 |
| 4 | 1 | 2 |
| 5 | 1 | 3 (Direct) |
| 6 | 2 | 2 |
| 7 | 2 | 3 (Direct) |
| 8 | 3 (Direct) | 2 |
| 9 | 3 (Direct) | 3 (Direct) |

FIG. 4

TRANSMISSION FOR A VEHICLE

CROSS REFERENCE TO RELATED APPLICATIONS

This application claims foreign priority to European Patent Application No. 21162190.9, filed on Mar. 12, 2021, the disclosure and content of which is incorporated by reference herein in its entirety.

TECHNICAL FIELD

The invention relates to a transmission for a vehicle and to a vehicle comprising a transmission.

The invention can be applied in heavy-duty vehicles, such as trucks, buses and construction equipment. Although the invention will be described with respect to a truck, the invention is not restricted to this particular vehicle, but may also be used in other vehicles such as other types of trucks, buses, construction equipment, including excavators, wheel loaders etc, and also passenger cars etc.

BACKGROUND

There are many types of power transmissions for vehicles, including manual transmissions and different types of automatic transmissions. For example, it is known to use automated manual transmissions (AMT) for e.g. trucks. An AMT for a truck may for example include 12 forward gears and one or more reverse gears. The gear shifts are performed by actuators which are controlled by a transmission control unit. The gear shifts are initiated by the transmission control unit based on manual input from a driver and/or based on information relating to vehicle speed, acceleration, weight, road grade, torque demand etc.

A power transmission is generally provided between one or more power units—such as an internal combustion engine (ICE) and/or one or more electric motors—and drive wheels, or the like, of the vehicle.

Even though the above-mentioned AMT for a truck has shown to be very efficient, reliable and robust for its purpose, it may however result in e.g. bulky dimensioning of its gear wheels, bearings and shafts. A reason for this is that the AMT must be designed to withstand high radial forces and high forces on its gear teeth.

SUMMARY

In view of the above, an object of the invention is to provide a transmission for a vehicle, which provides high efficiency and high torque-to-weight ratio, and which is cost-efficient. Another object of the invention is to provide a vehicle which comprises the transmission.

According to a first aspect of the invention, the object is achieved by a transmission for a vehicle according to claim 1. According to a second aspect of the invention, the object is achieved by a vehicle according to claim 14.

Thus, according to the first aspect, a transmission for a vehicle is provided, wherein the transmission is configured to provide nine forward gears in sequence from the first gear to the ninth gear. The transmission comprises:
  a first and a second planetary gear set comprising a respective input and output, wherein:
    the output of one of the first and second planetary gear sets is drivingly connected to the input of the other one of the first and second planetary gear sets;
    each planetary gear set is configured to provide a first and a second forward speed reduction and one direct speed with a one to one (1:1) speed ratio, the first forward speed reduction being larger than the second forward speed reduction, thereby providing three forward speeds with different speed ratios; and
    each planetary gear set is configured to be individually shiftable between its three forward speeds;
  wherein the transmission is configured to provide:
    the first to third gears by utilizing the first forward speed reduction of the second planetary gear set and by alternating the three forward speeds with different speed ratios of the first planetary gear set;
    the fourth to fifth gears by utilizing the first forward speed reduction of the first planetary gear set and by alternating the second planetary gear set between its second forward speed reduction and its direct speed; and
    the sixth to seventh gears by utilizing the second forward speed reduction of the first planetary gear set and by alternating the second planetary gear set between its second forward speed reduction and its direct speed;
    the eighth to ninth gears by utilizing the direct speed of the first planetary gear set and by alternating the second planetary gear set between its second forward speed reduction and its direct speed.

By the provision of the transmission as disclosed herein, a vehicle transmission with high efficiency and a high torque-to-weight ratio is achieved. In addition, the transmission may provide a cost-efficient configuration since the nine forward gears can be provided by only using two planetary gear sets. Thus, according to an example embodiment, the transmission comprises only two planetary gear sets, or only two planetary gear sets for providing the nine forward gears, i.e. the first and second planetary gear sets. The invention is based on a realization to utilize the above-mentioned three torque paths of each planetary gear set in order to provide the nine forward gears. For example, the configuration has shown to be able to provide nine forward gears in sequence with a suitable difference between each consecutive gear from the lowest to the highest gear. More specifically, the invention is based on a realization to utilize the two forward speed reductions and a direct speed torque path of each planetary gear set to provide the nine forward gears. By said configuration, the speed of e.g. an ICE can be optimized, implying improved energy efficiency. In prior art transmissions using planetary gear sets, more planetary gear sets have been used for providing the gears. For example, eight gears have been provided by use of four planetary gear sets, thus resulting in a more bulky and heavy design. Accordingly, by the present invention, more gears will be provided, i.e. nine forward gears, with a beneficial gear sequence, implying increased efficiency, high torque-to-weight ratio and cost-efficiency. In addition, the transmission as disclosed herein has also shown to reduce the transmission weight compared to prior art AMT:s.

It shall be noted that the nine forward gears have different speed ratios, where speed ratio may be defined as the input speed in relation to the output speed of each gear. The speed ratio for a lower gear is higher than the speed ratio of a higher gear, i.e. the speed ratio of the first gear is higher than the speed ratio of the second gear, and so on.

Further advantages and advantageous features of the invention are disclosed in the following description and in the dependent claims.

Optionally, the first and second planetary gear sets may be configured axially in series, implying a compact transmission design.

Optionally, the second planetary gear set may further comprise a reverse gear, wherein preferably the transmission is further configured to provide three reverse gears with different speed ratios by utilizing the reverse gear of the second planetary gear set and by alternating the three forward speeds with different speed ratios of the first planetary gear set. Thereby the transmission may in addition to the nine forward gears also provide at least one, preferably three, reverse gears by use of the first and second planetary gear sets. As such, reverse gears may also be provided in a cost-efficient manner, i.e. by only utilizing the two planetary gear sets.

Optionally, the first and second planetary gear sets may have one gear shifting actuator each, preferably connected to a shift fork, for individually shifting the first and second planetary gear sets between their respective three forward speeds with different speed ratios. Thereby, the gear shifts may be performed in an efficient manner by only using two actuators, one for each planetary gear set, implying reduced weight and a more compact transmission.

Optionally, at least one of the first and second planetary gear sets may comprise three engagement members for providing the three forward speeds with different speed ratios, wherein the three engagement members are axially connected for moving together during shifting but arranged to be rotationally free with respect to each other. Thereby the gear shifts can be easily performed in an efficient manner. For example, the three engagement members may be engagement sleeves. Still further, each one of the first and second planetary gear set may comprise three engagement members. The three engagement members of each planetary gear set are preferably movable by use of the aforementioned actuators, via e.g. shift-forks.

Still optionally, the three engagement members may be provided radially outside its respective planetary gear set. Thereby, a less complex transmission configuration may be provided, implying increased cost-efficiency.

Optionally, each planetary gear set comprises a sun gear, a ring gear and a planet carrier, wherein the first speed reduction of each planetary gear set may be provided by using the sun gear as input, fixing the ring gear to a fixed member and using the planet carrier as output, and wherein the second speed reduction of each planetary gear set may be provided by using the ring gear as input, fixing the sun gear to the fixed member and using the planet carrier as output.

Optionally, the first and second planetary gear sets may have different speed ratios between their respective ring gear and sun gear, wherein preferably the second planetary gear set has a higher speed ratio than the first planetary gear set. Thereby, the difference in speed ratio between the nine gears may be better adapted for the transmission's demands, for example if the transmission is to be used in a truck, such as a heavy-duty truck. The planetary gear set with the higher speed ratio is preferably a planetary gear set with a reverse gear, as mentioned in the above.

Optionally, the transmission may further comprise at least one friction clutch, wherein the direct speed of at least one of the first and second planetary gear sets is actuatable by the at least one friction clutch. Thereby, by actuating the at least one of the first and second planetary gear sets by the at least one friction clutch, the torque drop during gear shifts may be reduced, implying smoother gear shifts.

Optionally, at least one of the first and second planetary gear sets may further be configured to provide a first forward speed increase for providing at least one overdrive gear of the transmission. Thereby, a more versatile transmission may be provided since it will increase the total ratio spread and the number of gears. Preferably, the first forward speed increase is a relatively low speed increase, i.e. lower than a highest possible forward speed increase of the first or second planetary gear set.

Optionally, the speed ratio of the third gear divided by the speed ratio of the fourth gear may be:
 smaller than the speed ratio of the first gear divided by the speed ratio of the second gear and smaller than the speed ratio of the second gear divided by the speed ratio of the third gear; and/or
 larger than the speed ratio of the fourth gear divided by the speed ratio of the fifth gear, larger than the speed ratio of the fifth gear divided by the speed ratio of the sixth gear, larger than the speed ratio of the sixth gear divided by the speed ratio of the seventh gear, larger than the speed ratio of the seventh gear divided by the speed ratio of the eighth gear, and larger than the speed ratio of the eight gear divided by the speed ratio of the ninth gear.

By the above configuration(s), a more beneficial gear sequence can be provided, especially for a heavy-duty vehicle, implying increased energy efficiency. For example, it has been realized that it may be beneficial to have relatively large steps when shifting gears from the first to the second gear and from the second to the third gear, respectively. In addition, it has further been realized that it may also be beneficial to have relatively smaller steps when shifting from the third gear to the fourth gear, and so on.

Thereby, according to an example embodiment, the transmission may be configured such that the speed ratio of the first gear divided by the speed ratio of the second gear, and/or the speed ratio of the second gear divided by the speed ratio of the third gear, is in the range of 1.4-1.8. Still further, according to yet another example embodiment, any one of:
 the speed ratio of the fourth gear divided by the speed ratio of the fifth gear;
 the speed ratio of the fifth gear divided by the speed ratio of the sixth gear;
 the speed ratio of the sixth gear divided by the speed ratio of the seventh gear;
 the speed ratio of the seventh gear divided by the speed ratio of the eighth gear; or
 the speed ratio of the eighth gear divided by the speed ratio of the ninth gear;
 is in the range of 1.1-1.4.

Preferably, the transmission is an automated transmission, wherein the gear shifts are automatically performed by use of e.g. the above-mentioned actuators. The actuators are preferably controlled by a transmission control unit, which may form part of the transmission. The transmission control unit preferably comprises hardware or hardware and software configured for controlling the gear shifting. A transmission control unit is known per se and will therefore not be described more in detail herein.

The aforementioned actuators are for example actuated by use of pressurized air, i.e. by a pneumatic system. Additionally, or alternatively, the actuators may be actuated by use of at least one of a hydraulic system or an electromechanical system.

According to the second aspect of the invention, a vehicle is provided which comprises the transmission according to any one of the embodiments of the first aspect of the invention. The vehicle may be any type of vehicle as disclosed herein, but is preferably a heavy-duty vehicle, such as a heavy-duty truck.

Optionally, the vehicle may comprise an auxiliary motor connected to at least one of the inputs and outputs of the first and second planetary gear sets, wherein the auxiliary motor is configured for synchronizing the first and second planetary gear sets during gear shifting, for brake energy recuperation and/or for propulsion of the vehicle. By synchronizing is here meant to synchronize the input and output speeds of the first and second planetary gear sets during gear shifting. The auxiliary motor may be an electric motor. The auxiliary motor may also be used for at least temporarily providing increased power to the output from the transmission.

The vehicle may comprise a main power unit, such as an ICE as mentioned in the above. It shall be noted that the vehicle may be a hybrid vehicle, comprising at least two different power units, such as an ICE and at least one electric motor, or a fully electric vehicle. The power unit(s) of the vehicle may use any type of fuel or energy source, such as diesel, gasoline, natural gas and/or batteries, fuel cells etc. for driving one or more electric motors.

BRIEF DESCRIPTION OF THE DRAWINGS

With reference to the appended drawings, below follows a more detailed description of embodiments of the invention cited as examples.

In the drawings:

FIG. 4 shows a table including nine forward gears and three reverse gears of a transmission according to an example embodiment of the present invention.

Figure 1:
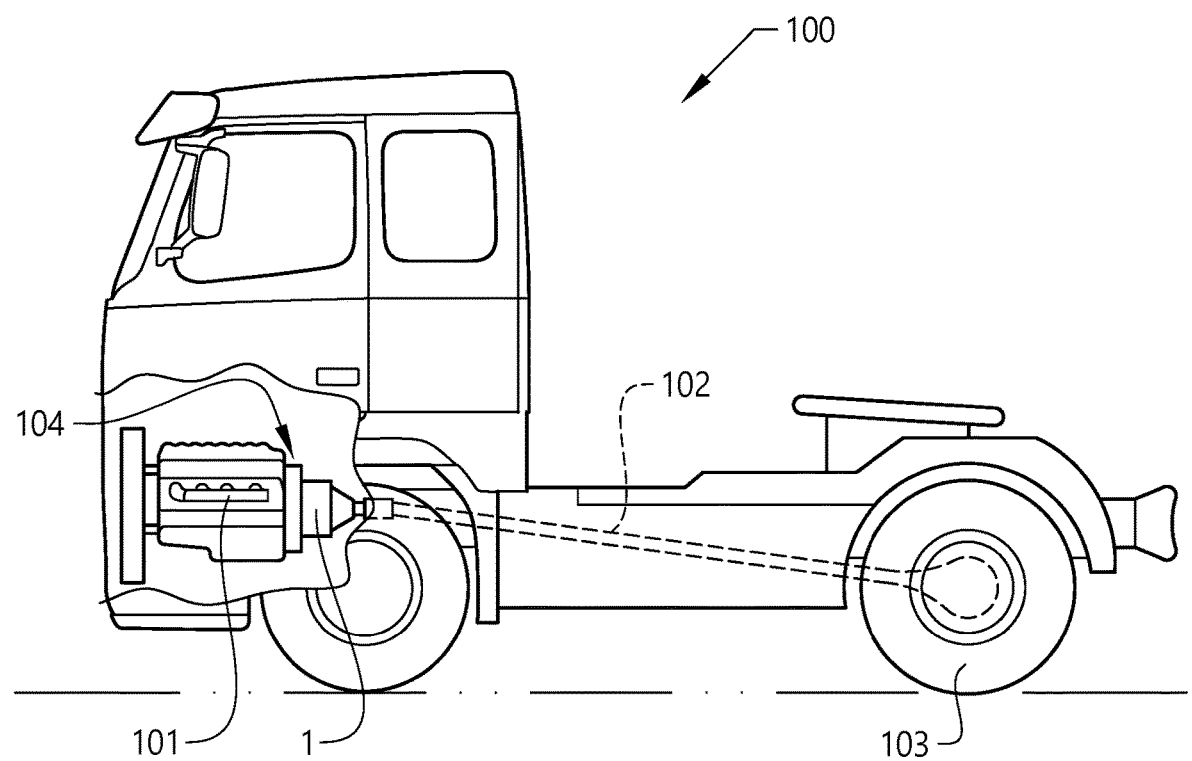
FIG. 1 is a side view of a vehicle according to an example embodiment of the present invention.

The drawings show diagrammatic exemplifying embodiments of the present disclosure and are thus not necessarily drawn to scale. It shall be understood that the embodiments shown and described are exemplifying and that the invention is not limited to these embodiments. It shall also be noted that some details in the drawings may be exaggerated in order to better describe and illustrate the particular embodiment. Like reference characters refer to like elements throughout the description, unless expressed otherwise.

DETAILED DESCRIPTION OF EXAMPLE EMBODIMENTS OF THE INVENTION

FIG. 1 depicts a vehicle 100 according to an example embodiment of the second aspect of the present invention. The vehicle 100 is here a heavy-duty truck, more specifically a towing truck, or tractor, for pulling one or more trailers (not shown). As mentioned in the above, the vehicle may be any type of vehicle, including but not limited to buses, wheel loaders, excavators, passenger cars etc.

The vehicle 100 comprises a power unit 101, which here is an ICE, and a transmission 1 according to an example embodiment of the first aspect of the invention. The power unit 101 is drivingly connectable to the transmission 1 via a clutch 104. The vehicle 100 further comprises a propulsion shaft 102 which drivingly connects the transmission 1 to drive wheels 103 of the vehicle 100. The drive wheels 103 are here the rear wheels of the truck 100. The propulsion shaft 102 is drivingly connected to the drive wheels 103 via e.g. a differential (not shown). Even though drive wheels 103 are shown in this embodiment, it shall be understood that any other type of ground engaging means may be used, such as crawler members of an excavator.

Referring to FIGS. 2a-i, a schematic illustration of a transmission 1 according to an example embodiment of the invention is shown. The transmission 1 is configured to provide nine forward gears in sequence from the first gear to the ninth gear, see FIG. 2a to FIG. 2i.

The transmission 1 comprises:
a first 10 and a second 20 planetary gear set comprising a respective input I10, I20 and output O10, O20.

The first and second planetary gear sets 10, 20 may be configured axially in series, wherein the output O10 of the first planetary gear set 10 is drivingly connected to the input I20 of the second planetary gear set 20. Axial as used herein refers to an axial extension of the planetary gear sets 10, 20. Accordingly, a radial extension herein refers to a radial extension of the planetary gear sets, which is perpendicular to the axial extension. It shall in this regard be noted that FIGS. 2a-i are schematic to illustrate the connections between the two planetary gear sets 10, 20, i.e. they do not show that they are configured axially in series.

Each planetary gear set 10, 20 is configured to provide a first and a second forward speed reduction and one direct speed with a one to one (1:1) speed ratio. The first forward speed reduction is larger than the second forward speed reduction, thereby providing three forward speeds with different speed ratios for each planetary gear set 10, 20. In addition, each planetary gear set 10, 20 is configured to be individually shiftable between its three forward speeds.

Figure 2A:
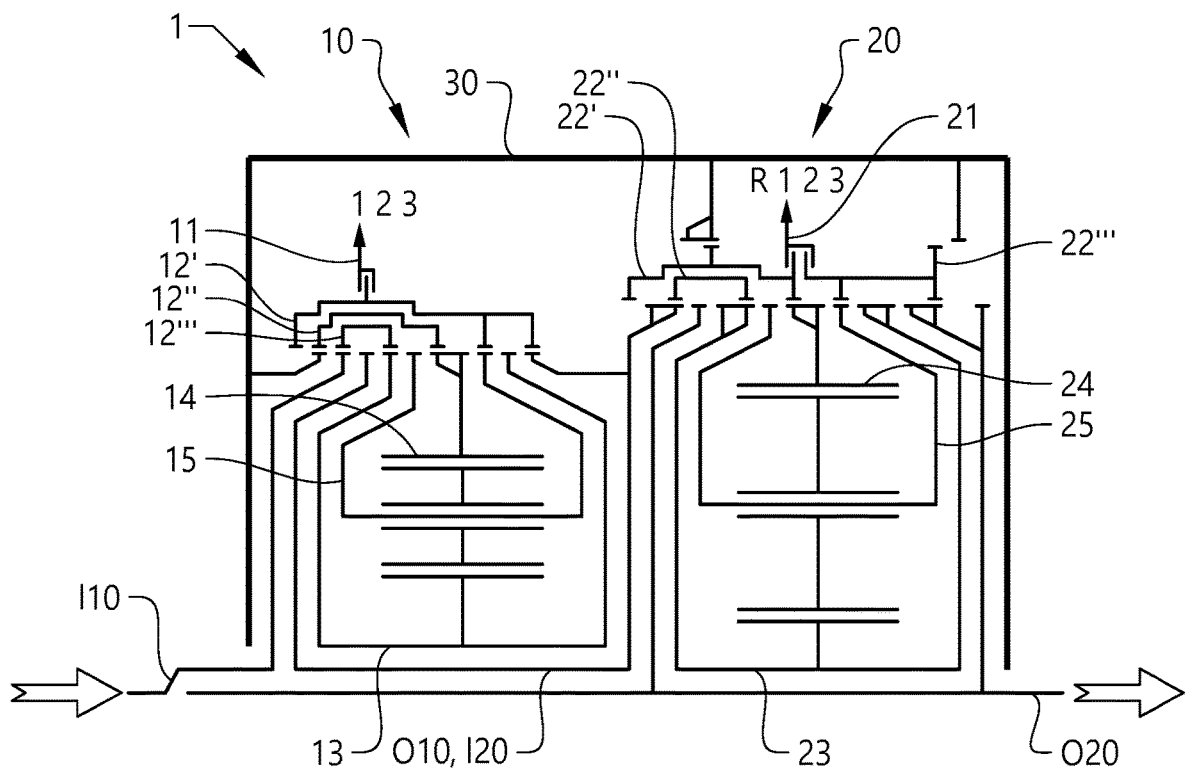
FIGS. 2a-i show schematic drawings of a transmission according to an example embodiment of the present invention.
Figure 2B:
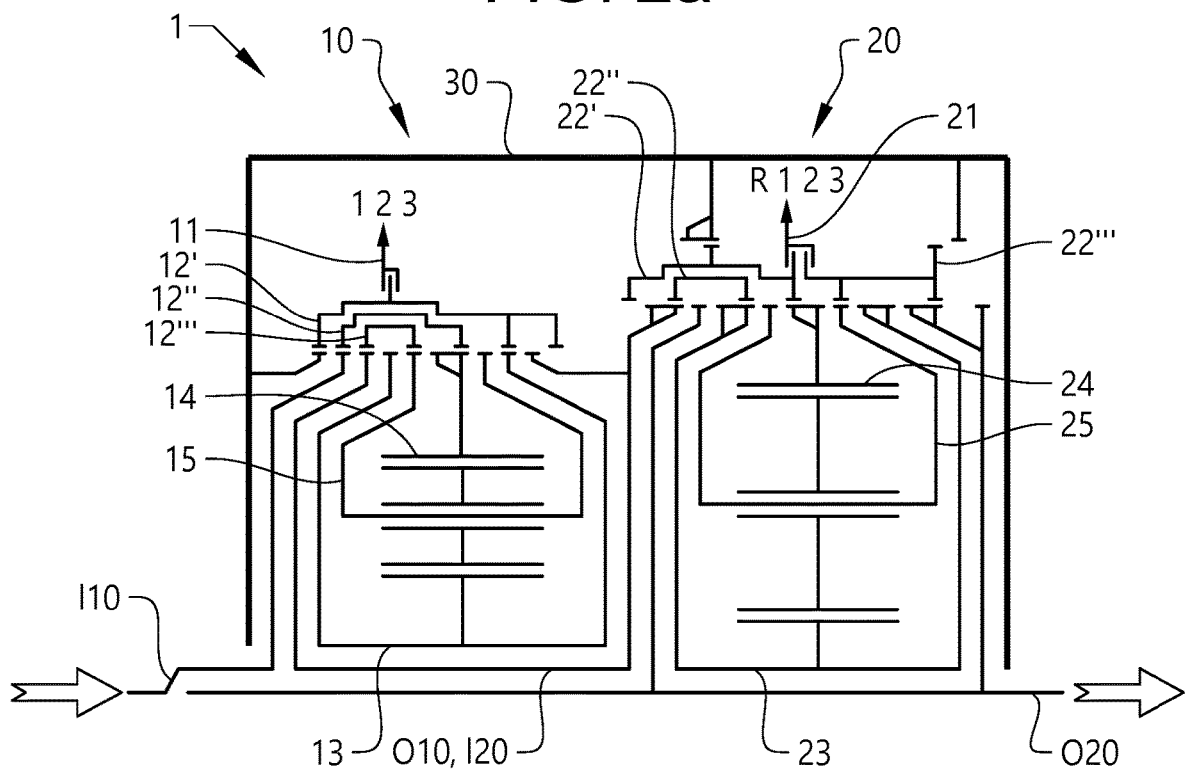
Figure 2C:
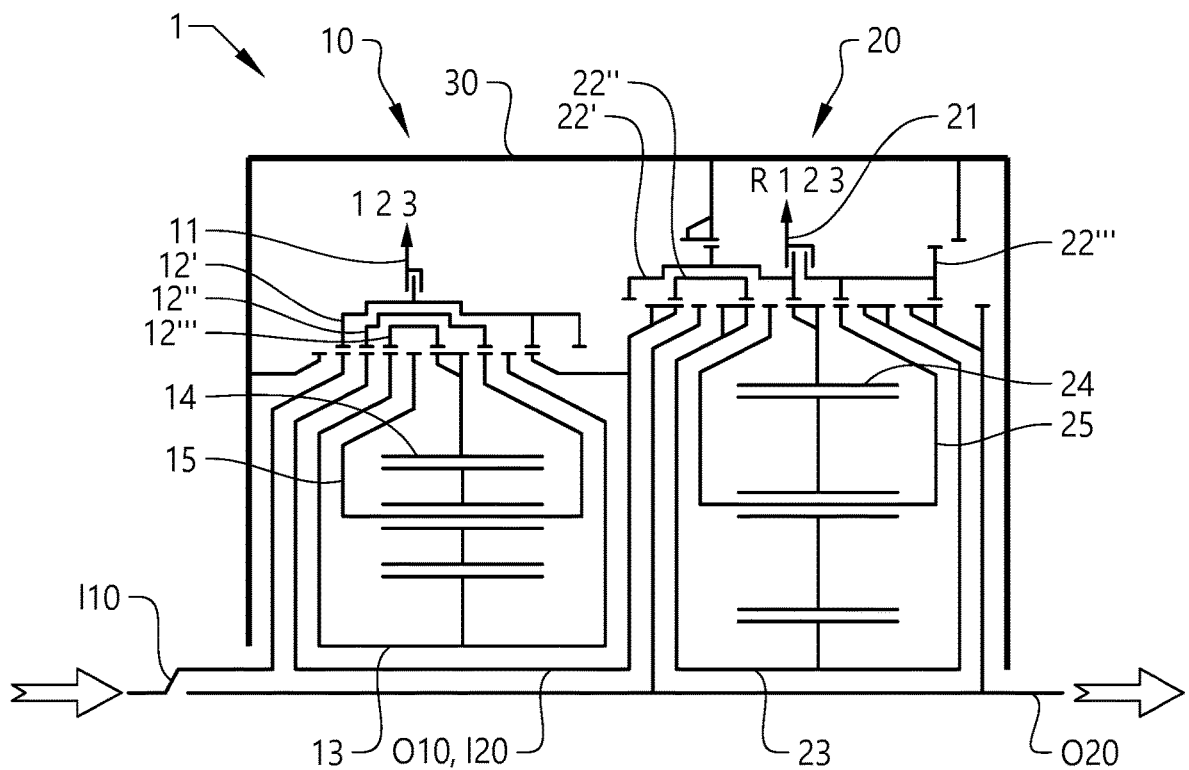
Figure 2D:
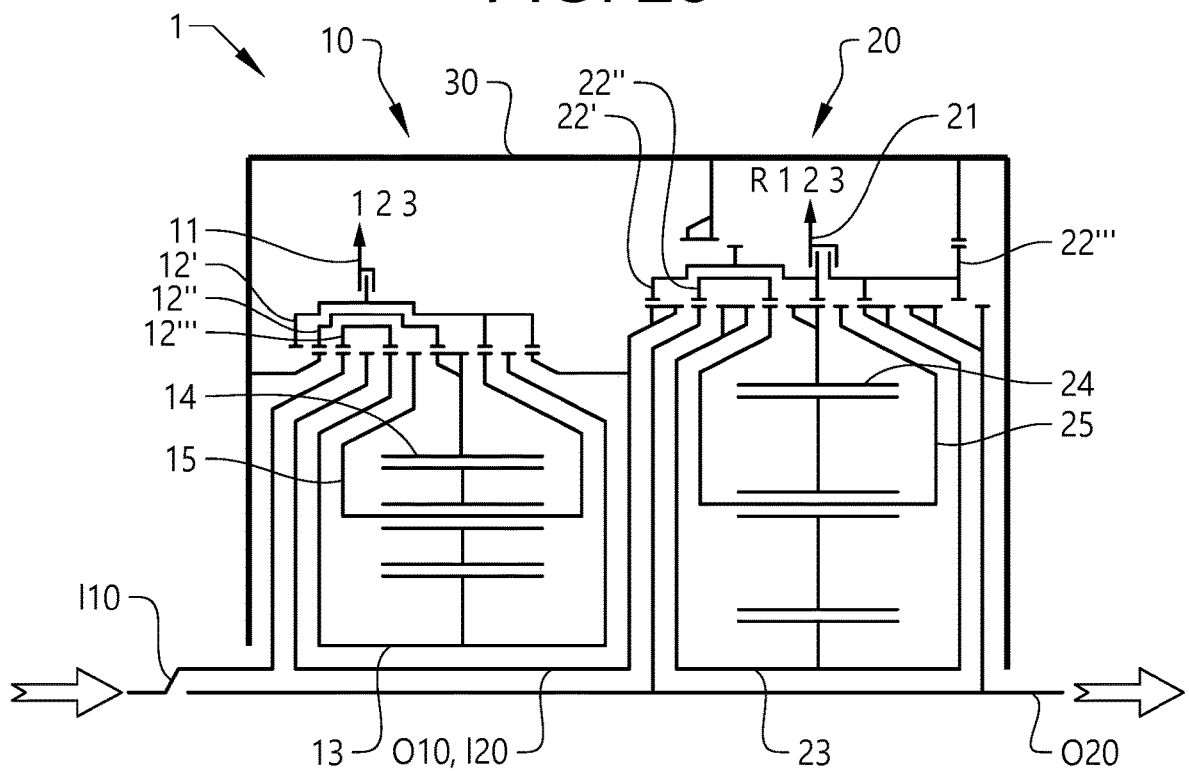
Figure 2E:
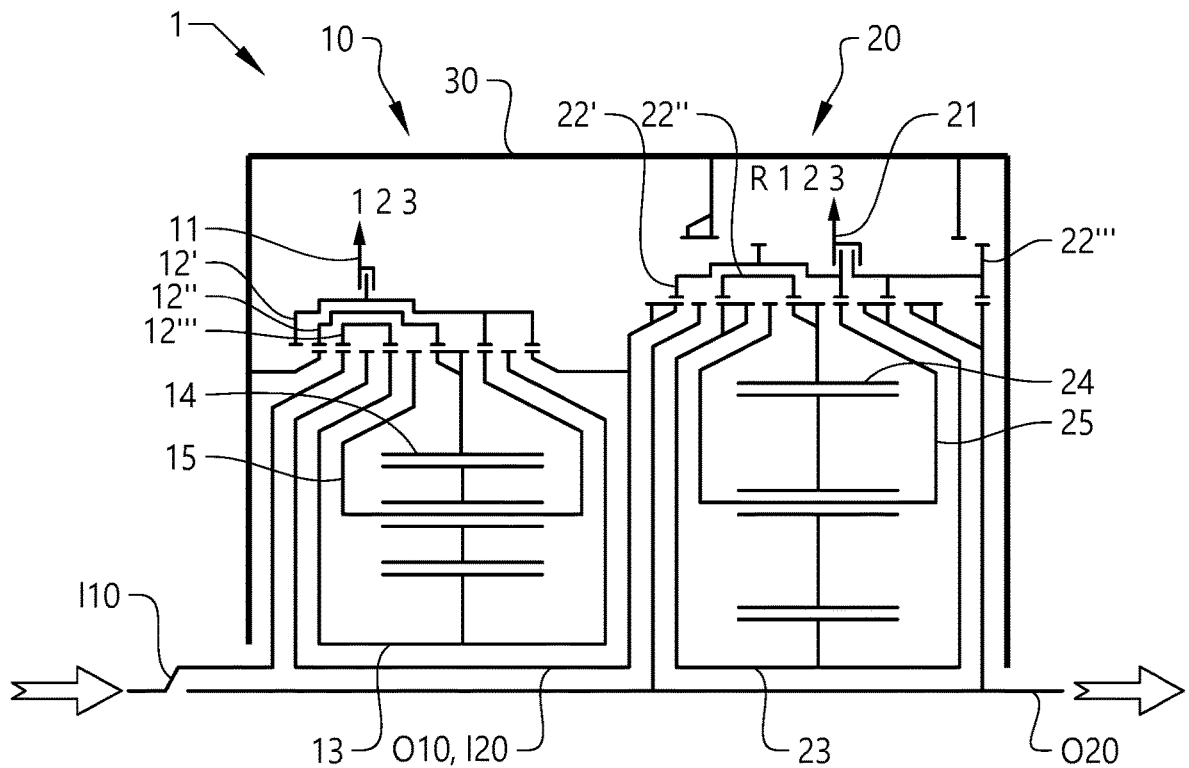
Figure 2F:
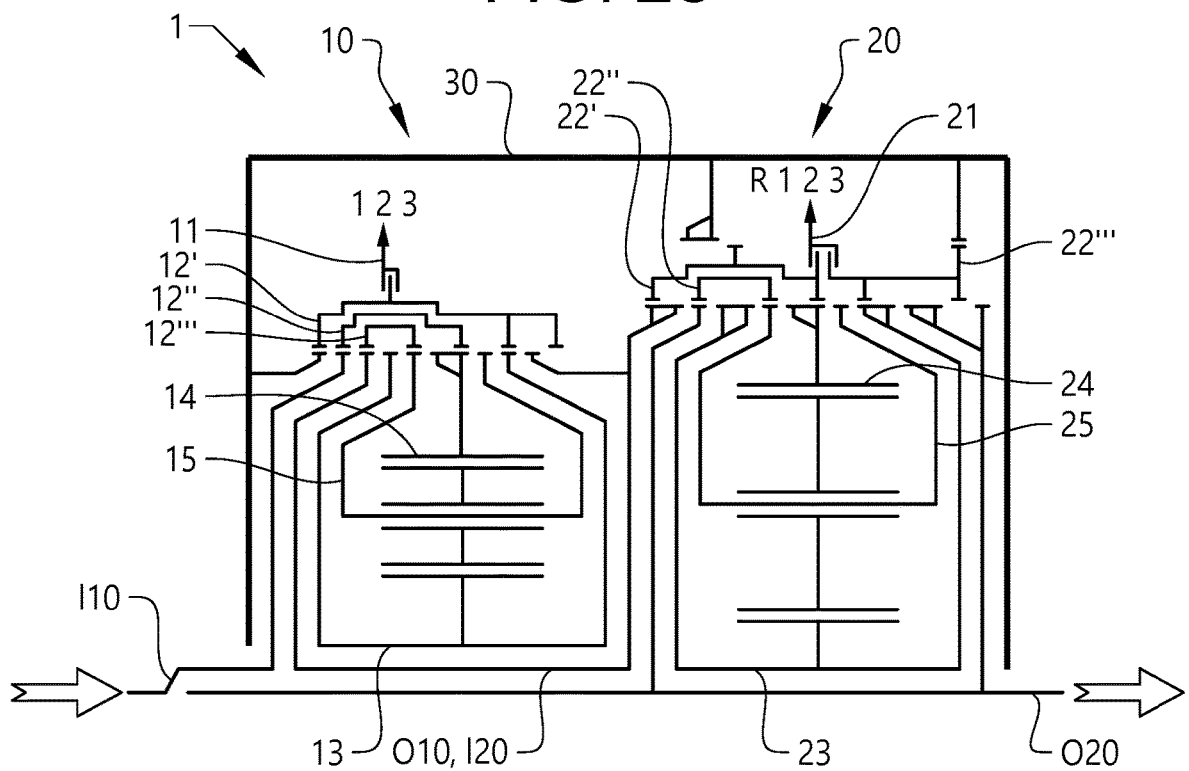
Figure 2G:
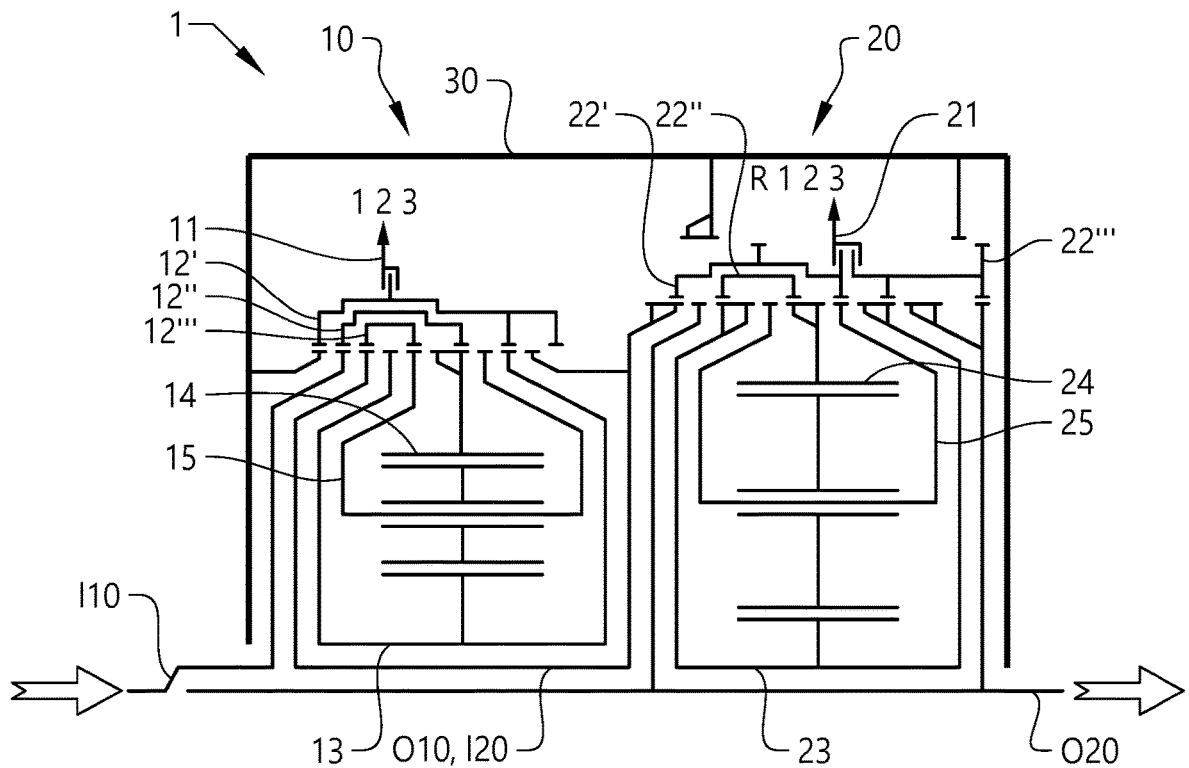
Figure 2H:
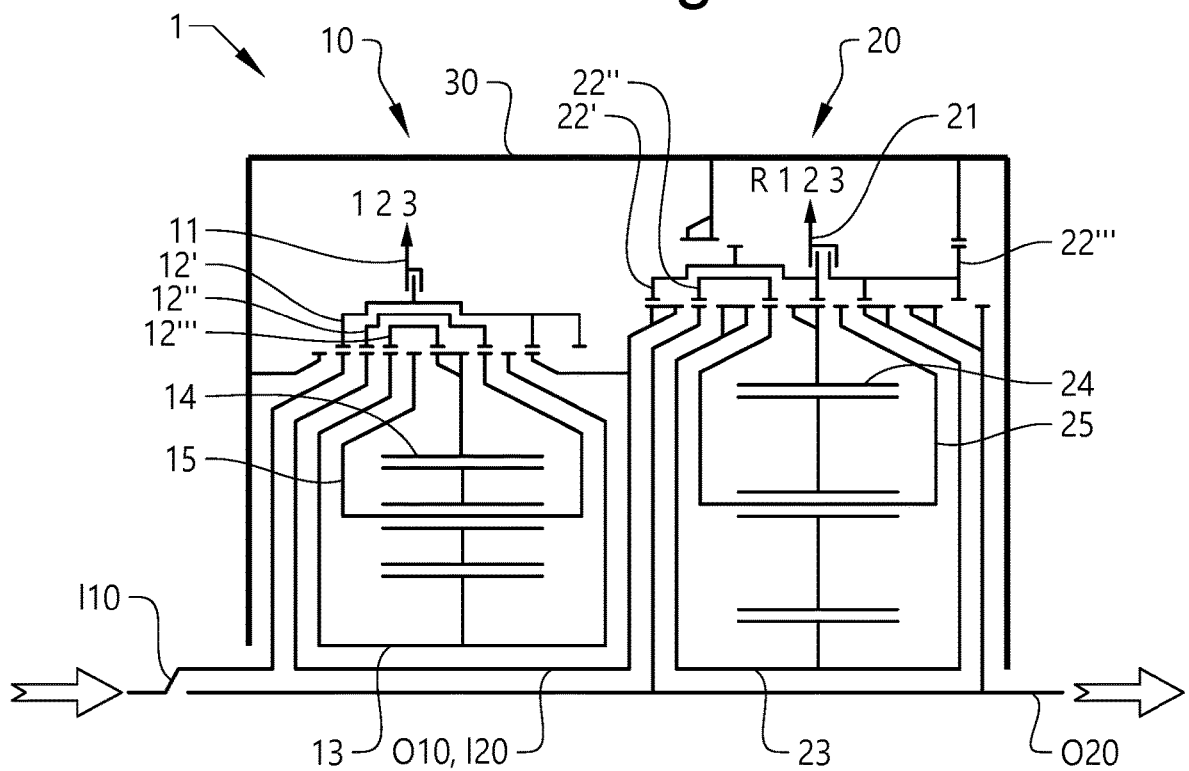
Figure 2I:
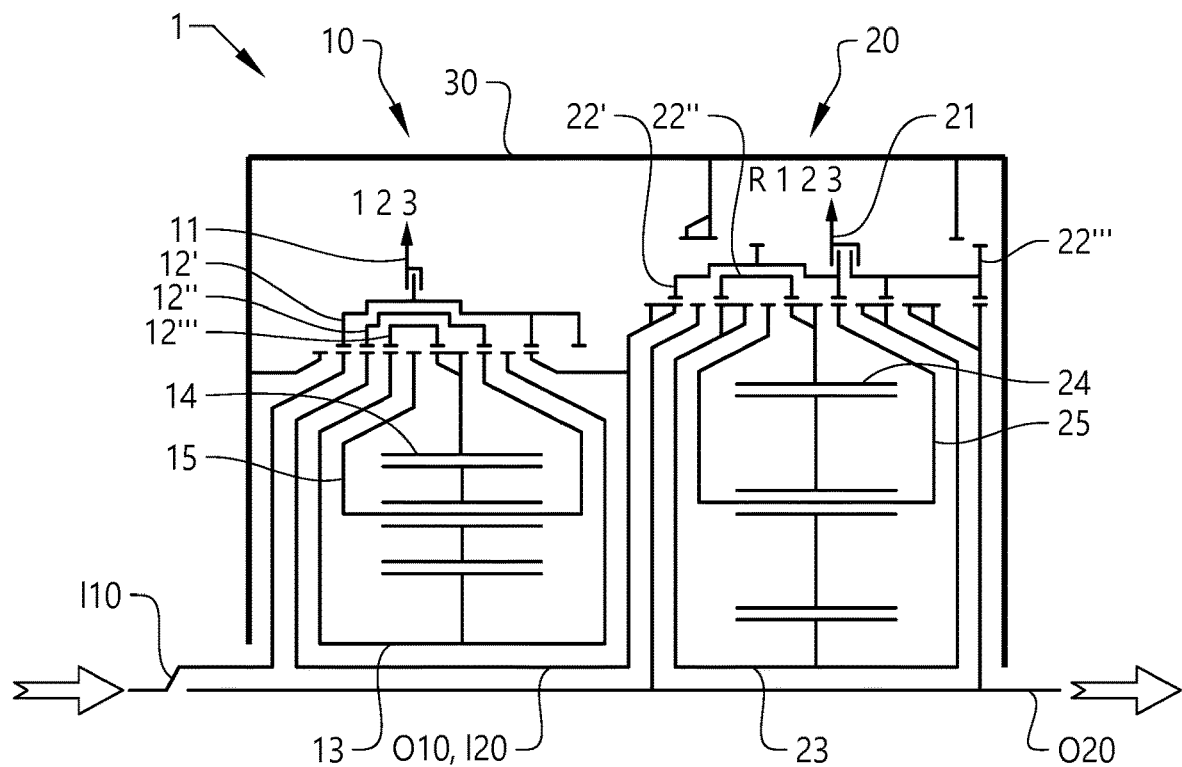

The transmission 1 is configured to provide:
the first to third gears, as shown in FIGS. 2a-c, by utilizing the first forward speed reduction of the second planetary gear set 20 and by alternating the three forward speeds with different speed ratios of the first planetary gear set 10.

the fourth to fifth gears, as shown in FIGS. 2d-e, by utilizing the first forward speed reduction of the first planetary gear set 10 and by alternating the second planetary gear set 20 between its second forward speed reduction and its direct speed;

the sixth gear, as shown in FIG. 2f, by utilizing the second forward speed reduction of the first planetary gear set 10 and the second forward speed reduction of the second planetary gear set 20;

the seventh gear, as shown in FIG. 2g, by utilizing the second forward speed reduction of the first planetary gear set 10 and the direct speed of the second planetary gear set 20;

the eighth gear, as shown in FIG. 2h, by utilizing the direct speed of the first planetary gear set 10 and the second forward speed reduction of the second planetary gear set 20; and the ninth gear, as shown in FIG. 2i, by utilizing the direct speeds of the first and the second planetary gear sets 10, 20.

The second planetary gear set 20 of the shown transmission 1 further comprises a reverse gear R. Thereby, the transmission 1 as shown is further configured to provide three reverse gears with different speed ratios by utilizing the reverse gear R of the second planetary gear set 20 and by alternating the three forward speeds with different speed ratios of the first planetary gear set 10.

In addition, referring to FIGS. 2a-i, the first and second planetary gear sets 10, 20 may have one gear shifting actuator each (not shown) which are connected to a respective shift fork 11, 21, for individually shifting the first and second planetary gear sets 10, 20 between their respective three forward speeds with different speed ratios.

Furthermore, the first and second planetary gear sets 10, 20 may as shown comprise three engagement members 12', 12", 12''' for the first planetary gear set 10, and 22', 22", 22''' for the second planetary gear set 20. The three engagement members 12', 12", 12''' and 22', 22", 22'' for each planetary gear set 10, 20 are configured to provide the three forward speeds with different speed ratios. They are further axially connected for moving together during shifting but arranged to be rotationally free with respect to each other. This has shown to provide an improved configuration for shifting between the gears. As shown, the three engagement members 12', 12", 12'''; 22', 22", 22''' are provided radially outside its respective planetary gear set 10, 20, thereby providing a less complex configuration, implying facilitated manufacturing and/or cost efficiency. The above-mentioned shift forks 11, 21 are here used for axially moving the respective engagement members 12', 12", 12''' and 22', 22", 22''', i.e. the two actuators move the engagement members. Accordingly, by this configuration only two shift forks 11, 21, and consequently only two actuators, are required for performing the gear shifts.

Each planetary gear set 10, 20 comprises a respective sun gear 13 and 23, a respective ring gear 14, 24, and a respective planet carrier 15, 25. The first speed reduction of each planetary gear set 10, 20 is provided by using the sun gear 13, 23 as input, fixing the ring gear 14, 24 to a fixed member 30 and using the planet carrier 15, 25 as output. The second speed reduction of each planetary gear set 10, 20 is provided by using the ring gear 14, 24 as input, fixing the sun gear 13, 23 to the fixed member 30 and using the planet carrier 15, 25 as output. The fixed member 30 may for example be a transmission housing.

The first and second planetary gear sets 10, 20 may have different speed ratios between their respective ring gear 14, 24 and sun gear 13, 23, wherein preferably the second planetary gear set 20 has a higher speed ratio than the first planetary gear set 10. Purely by way of example, the speed ratio of the ring gear 14 and the sun gear 13 may be 89/55, and the speed ratio of the ring gear 24 and the sun gear 23 may be 125/34. As such, according to this example, the second planetary gear set 20 has a higher speed ratio than the first planetary gear set 10, i.e. 125/34 is higher than 89/55.

The transmission 1 may further comprise at least one friction clutch (not shown), wherein the direct speed of at least one of the first and second planetary gear sets 10, 20 is actuatable by the at least one friction clutch. Either planetary gear set, such as the second planetary gear set 20 may further be configured to provide a first forward speed increase for providing at least one overdrive gear of the transmission 1 (not shown).

Furthermore, the speed ratio of the third gear divided by the speed ratio of the fourth gear may be:
  smaller than the speed ratio of the first gear divided by the speed ratio of the second gear and smaller than the speed ratio of the second gear divided by the speed ratio of the third gear; and/or
  larger than the speed ratio of the fourth gear divided by the speed ratio of the fifth gear,
  larger than the speed ratio of the fifth gear divided by the speed ratio of the sixth gear,
  larger than the speed ratio of the sixth gear divided by the speed ratio of the seventh gear,
  larger than the speed ratio of the seventh gear divided by the speed ratio of the eighth gear, and larger than the speed ratio of the eight gear divided by the speed ratio of the ninth gear.

Figure 3:
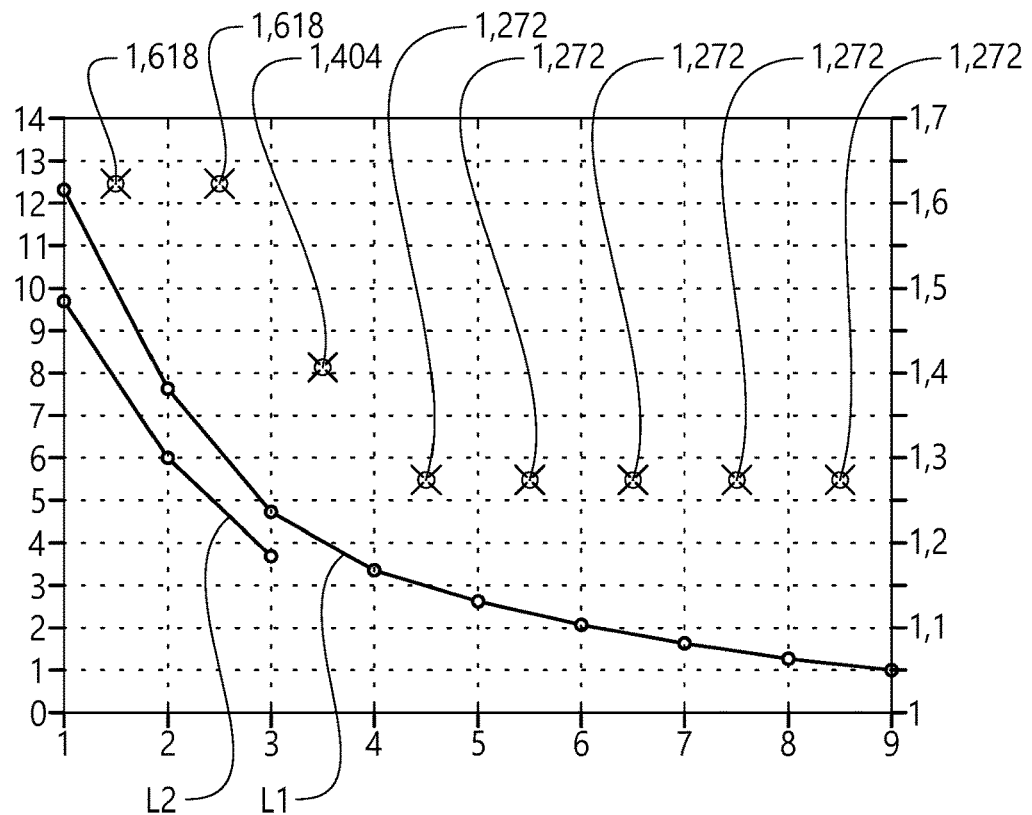
FIG. 3 shows a diagram for a transmission comprising nine forward gears and three reverse gears according to an example embodiment of the present invention.

Such a configuration is for example illustrated in FIG. 3. More specifically, FIG. 3 depicts a diagram showing the nine forward gears on the line L1 and the three reverse gears on the line L2. The left-hand vertical axis represent the speed ratio for each gear, and the right-hand vertical axis represent the size of the gear step between two consecutive gears, i.e. the speed ratio of the first gear divided by the speed ratio of the second gear, and so on.

As shown, the transmission 1 is configured such that the speed ratio of the first gear divided by the speed ratio of the second gear, and the speed ratio of the second gear divided by the speed ratio of the third gear, is in the range of 1.4-1.8. More specifically, it is about 1.6, or 1.618 to be more precise.

The speed ratio of the third gear divided by the speed ratio of the fourth gear is here about 1.4, or 1.404 to be more precise.

Furthermore, as shown in FIG. 3:
  the speed ratio of the fourth gear divided by the speed ratio of the fifth gear;
  the speed ratio of the fifth gear divided by the speed ratio of the sixth gear;
  the speed ratio of the sixth gear divided by the speed ratio of the seventh gear;
  the speed ratio of the seventh gear divided by the speed ratio of the eighth gear; or
  the speed ratio of the eighth gear divided by the speed ratio of the ninth gear;
  is in the range of 1.1-1.4. More specifically, it is about 1.3, or 1.272 to be more precise.

Such a configuration has shown to provide a beneficial gear sequence, optimizing the speed of e.g. the ICE 101, implying improved energy efficiency.

It shall be noted that the above mentioned more precise values are also rounded, and that the gear steps which may seem to be equal are not exactly equal, even though it has been found possible to make them arbitrarily close to equal.

The vehicle 100 may further comprise an auxiliary motor (not shown) connected to at least one of the inputs I10, I20 and outputs O10, O20 of the first and second planetary gear sets 10, 20, wherein the auxiliary motor is e.g. configured for synchronizing the first and second planetary gear sets during gear shifting.

Referring to FIG. 4, a table including the nine forward gears and the three reverse gears of the transmission 1 as shown in FIGS. 2a-i is depicted. In the table it is shown which one of the forward speed reductions and the direct speeds of the planetary gear sets 10, 20 which are utilized for achieving the respective gear. Group 1 refers to the first planetary gear set 10 and Group 2 refers to the second planetary gear set 20 comprising the reverse gear R. The forward speed reductions are denoted with "1" and "2", respectively, and the direct speed is denoted with "3" in the table, as also indicated in FIGS. 2a-i.

It is to be understood that the present invention is not limited to the embodiments described above and illustrated in the drawings; rather, the skilled person will recognize that many changes and modifications may be made within the scope of the appended claims.

The invention claimed is:

1. A transmission for a vehicle, wherein the transmission is configured to provide nine forward gears in sequence from the first gear to the ninth gear, the transmission comprising:
a first planetary gear set comprising an input and an output and a second planetary gear set comprising an input and an output, wherein:
the output of one of the first and second planetary gear sets is drivingly connected to the input of the other one of the first and second planetary gear sets;
each planetary gear set is configured to provide a first and a second forward speed reduction and one direct speed with a one to one (1:1) speed ratio, the first forward speed reduction being larger than the second forward speed reduction, thereby providing three forward speeds with different speed ratios; and
each planetary gear set is configured to be individually shiftable between its three forward speeds; and
wherein the transmission is configured to provide:
the first to third gears by utilizing the first forward speed reduction of the second planetary gear set and by alternating the three forward speeds with different speed ratios of the first planetary gear set;
the fourth to fifth gears by utilizing the first forward speed reduction of the first planetary gear set and by alternating the second planetary gear set between its second forward speed reduction and its direct speed;
the sixth to seventh gears by utilizing the second forward speed reduction of the first planetary gear set and by alternating the second planetary gear set between its second forward speed reduction and its direct speed;
the eighth to ninth gears by utilizing the direct speed of the first planetary gear set and by alternating the second planetary gear set between its second forward speed reduction and its direct speed.

2. The transmission according to claim 1, wherein the second planetary gear set further comprises a reverse gear.

3. The transmission according to claim 2, wherein the transmission is further configured to provide three reverse gears with different speed ratios by utilizing the reverse gear of the second planetary gear set and by alternating the three forward speeds with different speed ratios of the first planetary gear set.

4. The transmission according to claim 1, wherein the first and second planetary gear sets have one gear shifting actuator each.

5. The transmission according to claim 4, wherein each gear shifting actuator is connected to a shift fork, for individually shifting the first and second planetary gear sets between their respective three forward speeds with different speed ratios.

6. The transmission according to claim 1, wherein at least one of the first and second planetary gear sets comprises three engagement members for providing the three forward speeds with different speed ratios, wherein the three engagement members are axially connected for moving together during shifting but arranged to be rotationally free with respect to each other.

7. The transmission according to claim 6, wherein the three engagement members are provided radially outside its respective planetary gear set.

8. The transmission according to claim 1, wherein each planetary gear set comprises a sun gear, a ring gear and a planet carrier, wherein the first speed reduction of each planetary gear set is provided by using the sun gear as input, fixing the ring gear to a fixed member and using the planet carrier as output, and wherein the second speed reduction of each planetary gear set is provided by using the ring gear as input, fixing the sun gear to the fixed member and using the planet carrier as output.

9. The transmission according to claim 8, wherein the first and second planetary gear sets have different speed ratios between their respective ring gear and sun gear, wherein preferably the second planetary gear set has a higher speed ratio than the first planetary gear set.

10. The transmission according to claim 1, further comprising at least one friction clutch, wherein the direct speed of at least one of the first and second planetary gear sets is actuatable by the at least one friction clutch.

11. The transmission according to claim 1, wherein at least one of the first and second planetary gear sets is further configured to provide a first forward speed increase for providing at least one overdrive gear of the transmission.

12. The transmission according to claim 1, wherein the speed ratio of the third gear divided by the speed ratio of the fourth gear is:
smaller than the speed ratio of the first gear divided by the speed ratio of the second gear and smaller than the speed ratio of the second gear divided by the speed ratio of the third gear.

13. The transmission according to claim 12, wherein the transmission is configured such that the speed ratio of the first gear divided by the speed ratio of the second gear.

14. The transmission according to claim 12, wherein any one of:
the speed ratio of the fourth gear divided by the speed ratio of the fifth gear;
the speed ratio of the fifth gear divided by the speed ratio of the sixth gear;
the speed ratio of the sixth gear divided by the speed ratio of the seventh gear;
the speed ratio of the seventh gear divided by the speed ratio of the eighth gear; or
the speed ratio of the eighth gear divided by the speed ratio of the ninth gear;
is in a range of 1.1-1.4.

15. The transmission according to claim 12, wherein the transmission is configured such that the speed ratio of the second gear divided by the speed ratio of the third gear is in a range of 1.4-1.8.

16. A vehicle comprising the transmission according to claim 1.

17. The vehicle according to claim 16, comprising an auxiliary motor connected to at least one of the inputs and outputs of the first and second planetary gear sets, wherein the auxiliary motor is configured for synchronizing the first and second planetary gear sets during gear shifting, for brake energy recuperation, for propulsion of the vehicle, or both.

18. The transmission according to claim 1, wherein the speed ratio of the third gear divided by the speed ratio of the fourth gear is:
larger than the speed ratio of the fourth gear divided by the speed ratio of the fifth gear, larger than the speed ratio of the fifth gear divided by the speed ratio of the sixth gear, larger than the speed ratio of the sixth gear divided by the speed ratio of the seventh gear, larger than the speed ratio of the seventh gear divided by the speed ratio of the eighth gear, and larger than the speed ratio of the eight gear divided by the speed ratio of the ninth gear.

* * * * *